(12) United States Patent
Marsiglietti et al.

(10) Patent No.: US 6,387,251 B1
(45) Date of Patent: May 14, 2002

(54) APPARATUS FOR DOSING POWDERED OR GRANULATED ADDITIVES IN WATER WORKS, NAMELY SWIMMING POOLS

(75) Inventors: Luigi Marsiglietti; Sergio Milli; Giorgio Cesarini, all of Citta' Di Castello (IT)

(73) Assignee: Sintec S.r.l., Perugia (IT)

( * ) Notice: Subject to any disclaimer, the term of this patent is extended or adjusted under 35 U.S.C. 154(b) by 0 days.

(21) Appl. No.: 09/623,139

(22) PCT Filed: Feb. 23, 1999

(86) PCT No.: PCT/IT99/00046

§ 371 Date: Aug. 28, 2000

§ 102(e) Date: Aug. 28, 2000

(87) PCT Pub. No.: WO99/43620

PCT Pub. Date: Sep. 2, 1999

(30) Foreign Application Priority Data

Feb. 26, 1998 (IT) .......................................... FI98A0045

(51) Int. Cl.⁷ .............................................. B01D 35/00
(52) U.S. Cl. .................... 210/123; 210/198.1; 210/205; 422/106; 422/269; 366/182.4; 366/137

(58) Field of Search .......................... 210/86, 101, 104, 210/123, 128, 169, 198.1, 205, 206; 422/106, 261, 264, 269; 366/182.4, 137, 132

(56) References Cited

U.S. PATENT DOCUMENTS

| 2,486,650 A | | 11/1949 | Hepp et al. |
| 3,456,801 A | | 7/1969 | Bowles |
| 3,807,700 A | | 4/1974 | Kennedy |
| 4,224,154 A | * | 9/1980 | Steininger |
| 5,019,250 A | * | 5/1991 | Lorenzen |

* cited by examiner

Primary Examiner—Joseph W. Drodge
Assistant Examiner—Terry K. Cecil
(74) Attorney, Agent, or Firm—Browdy and Niemark

(57) ABSTRACT

An apparatus for dosing a granulated or powdered additive in the water of a water works includes a dosing assembly (10) with a water collecting tank (9) hydraulically connected to inflows (20, 21) of unmixed water and to an outflow of additive-mixed water (33) to the works. Unmixed water is tapped through a duct (41) from an inflow and fed to a substantially tubular manifold (18), upwardly connected to tank (19). The additive is delivered into manifold (18), in which the additive mixes with water tapped from the inflow through duct (41) and additive-mixed water discharges into collecting tank (19).

10 Claims, 3 Drawing Sheets

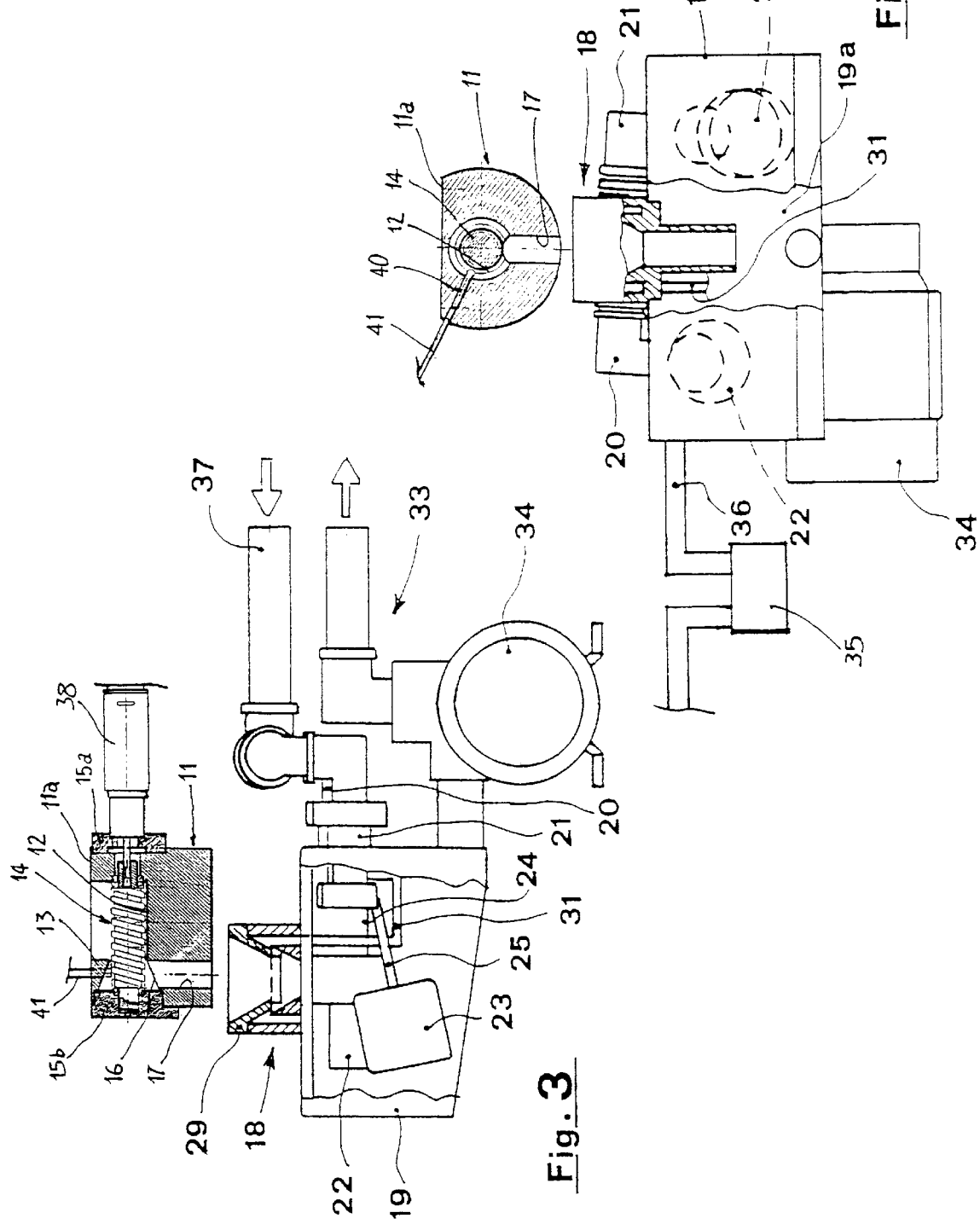

APPARATUS FOR DOSING POWDERED OR GRANULATED ADDITIVES IN WATER WORKS, NAMELY SWIMMING POOLS

DESCRIPTION

1. Field of the Invention

The present invention relates to an apparatus for dosing powdered or granulated additives in water works, in particular, but not exclusively, suitable for use in the field of swimming pools.

2. Description of the Prior Art

It is known that in water works the need often arises for the addition of water with antibacterial and/or generally disinfectant substances. Such substances, usually available in granular form and namely in powder, have to be dosed in a very precise and reliable way, in order to obtain the coverage required by the relevant hygienic regulations.

The problem is deeply felt in the case of swimming pools, chiefly public ones, where it is very difficult to guarantee wholly hygienic conditions, due to the organic pollution generated by swimmers, increased by the stagnant state of the water. On the other hand, the fulfilment of such conditions is fundamental to defend the swimmers' health, and in this viewpoint the relevant regulations are particularly severe.

According to the method presently used in this field, the disinfectant powder, typically based on calcium hypochlorite, or in any case on chlorine, is preliminarily dissolved in a separate tank The additive-mixed water is then taken out with suitable dosing pumps and fed to the main works. Apparatuses which operate according to this method are described in U.S. Pat. Nos. 3,456,801 and 3,807,700. This method has some important drawbacks.

The first of them is that, being chlorine in general light-sensitive, when the additive-mixed water stays in the preliminary tank for long periods, which can last even some days, its disinfectant power decreases. Such decrease can be approximately about 50% in just a single week of light exposure. Then, to guarantee the fulfilment of the chlorine-coverage requirements, it is necessary to use much more substance than that theorically required, with a remarkable cost increase for higher product consumptions.

In the second place, dosing pumps which feed additive-mixed water to the main works are subject to frequent occlusions and failures, with consequent high costs for maintenance operations and/or replacements of worn out components. In fact, as the, product is chemically attacking, the widths of the flow sections have to be kept very small, this involving high flow speeds, with consequent increase of wearing phenomena. Such small sections are also easily clogged by calcium hypoclorite deposits.

A further drawback of the above described conventional method is that the workers having to carry out routine and unpredictable maintenance operations of the dosing system are forced to operate in troublesome conditions, since water with a high additive concentration is remarkably toxic.

Finally, in many cases the degree of chlorine coverage which can be obtained is unsatisfactory. As a matter of fact, when the system starts a very long transient condition occurs and several hours pass before the product has spread throughout the whole water volume of the swimming pool. And, in any case, even when the system operates in steady conditions, the above described preliminary dilution jeopardises a completely satisfactory result, i. e. a homogeneous product spreading.

SUMMARY OF THE INVENTION

The main object of the present invention is to provide an apparatus for dosing a powdered or granulated additive in a water works, namely a swimming pool, which allows a direct dilution of the additive in the water works, thus avoiding the above described drawbacks caused by the presence of preliminary dilution means.

A particular object of the present invention is to provide an apparatus of the above mentioned kind, which allows the accomplishment of an effective and homogeneous spreading of the product with a simple structure, which can be easily operated.

A further object of the invention is to provide an apparatus of the above mentioned kind, in which the possibility that ducts may be clogged is minimised and so the machine stops for maintenance operations and/or replacements of worn out components are reduced.

Said objects have been achieved with the apparatus for dosing powdered or granulated additives in water works according to the present invention, the main features of which are defined in the first of the appended claims.

BRIEF DESCRIPTION OF THE DRAWINGS

Other features and advantages of the apparatus for dosing powdered or granulated additives according to the present invention will be apparent from the following description of one of its embodiments, to be intended only as an example and not a limitation, with reference to the attached drawings in which:

FIG. 3 shows a side view, with sectioned and/or broken parts, of the dosing assembly of the apparatus of FIGS. 1 and 2;

FIG. 4 is a front view, with sectioned and/or broken pares, of the dosing assembly of FIG. 3;

DESCRIPTION OF THE PREFERRED EMBODIMENT

Figure 1:
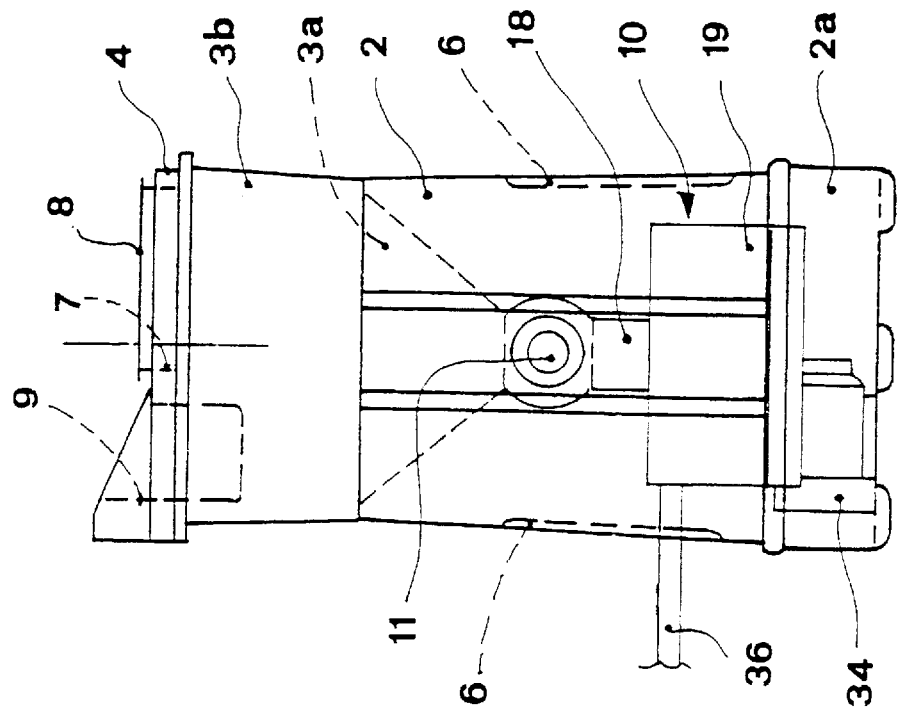
FIG. 1 shows a side view of the dosing apparatus according to the present invention.
Figure 2:
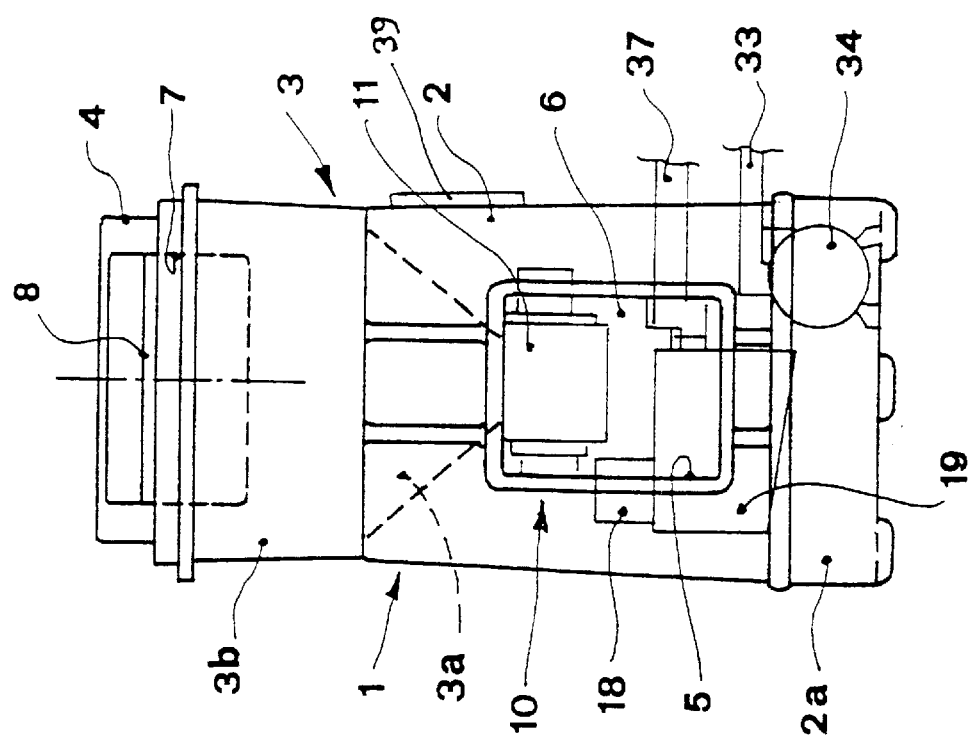
FIG. 2 is a front view of the dosing apparatus of FIG. 1.
Figure 5:
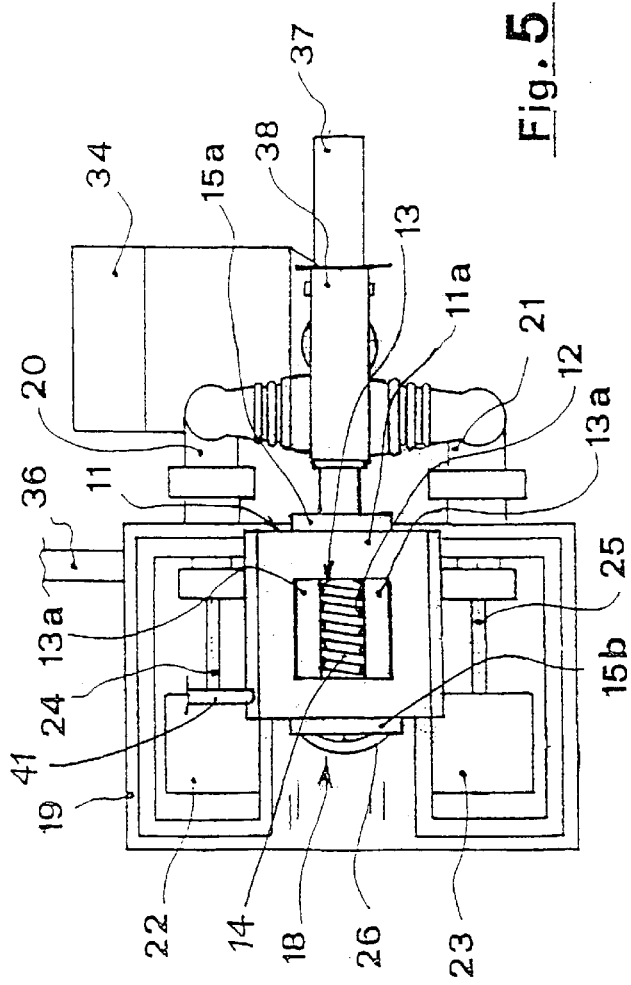
FIG. 5 shows a top plan view of the dosing assembly of FIGS. 3 and 4.

With reference in particular to FIGS. 1 and 2, a dosing apparatus according to the present invention comprises a box-shaped outer frame 1, made of a plastic material, having supporting and covering functions. Frame 1 comprises a lower container 2, standing from an enlarged base 2a, and a feedbox 3, upwards supported by lower container 2 and capable of collecting and conveying the powdered or granulated additive to be dosed. Feedbox 3 comprises a funnel-shaped lower section 3a, entirely placed within lower container 2 and ending with a port facing the bottom thereof, and an upper collar 3b, external to the container, closed by a cover 4.

Cover 4 has an upper opening 7, closed by a removable cap 8, through which the additive is poured into feedbox 3, and a housing 9 whose function will be made clearer hereinafter. Respective windows 5 are formed in two opposite side walls of lower container 2. Windows 5, each closed by a removable plate 6, permit the access to the inside of container 2 for the maintenance and/or the checking of the components housed therewithin.

Within container 2 it is in fact placed a dosing assembly, generally indicated at 10, schematically shown with faint lines in FIGS. 1 and 2, and in detail in FIGS. 3 to 6. With reference in particular to the latter, dosing assembly 10 comprises a delivery element 11, generally cylindrical and horizontally extending, the side surface of which, having an incomplete development, forms an upward flat face 11a. A cylindrical seat 12 is axially formed in element 11 and communicates with the outside of the element itself via a cavity 13, which opens in flat face 11a. In particular, cavity 13 communicates with the inside of funnel-shaped lower section 3a of feedbox 3 through its downward port, thus allowing the discharge of the powder into axial seat 12. To assist such discharge cavity 13 provides two opposite skew faces 13a, converging to seat 12.

A shaft 14 rotates within axial seat 12, supported by bushings 15a, 15b with ceramic seals and operated by a motor reducer 38. The side surface of shaft 14 is screwed so that it conveys the powder towards a collection chamber 16, conically shaped, formed in the front face of element 11 adjacent to bushing 15b. A passage 17, radially extending from chamber 16, lets the powder fall therefrom to the upward opening of a substantially tubular manifold 18, which will be described in detail hereinafter. A hole 40, radially formed in element 11, also opens into chamber 16. A duct 41 for feeding air to chamber 16 is coaxially engaged within hole 40.

A constant level tank 19, substantially parallelepiped shaped with a partially open top, is placed under delivery element 11. Water is discharged into tank 19 through a couple of inflow pipes, respectively indicated at 20 and 21, resulting from a T-junction with a main inflow pipe 37. Inflow pipes 20 and 21 open in a side wall 19a of tank 19, near the upper side thereof, at slightly different heights (in the figures, 20 indicates the higher inflow pipe), and are provided with respective check valves, not shown. The opening of the valves is operated by levers 24 and 25, controlled by respective floats 22 and 23, connected to the free ends thereof.

Figure 6:
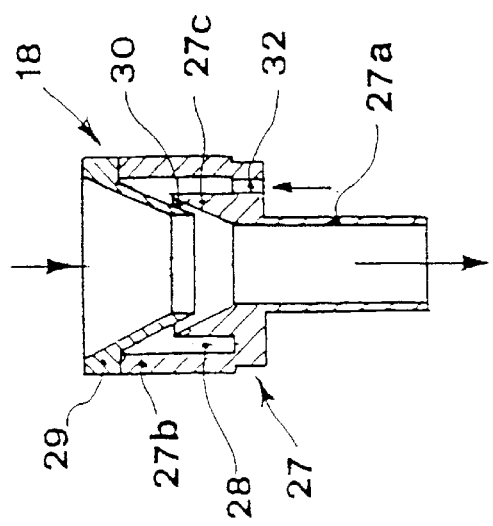
FIG. 6 is shows an intermediate cross section view of a manifold used in the dosing assembly of FIGS. from 3 to 5.

A circular opening 26 is formed in She top wall of tank 19, for engagement with manifold 18, shown in particular in FIG. 6. Manifold 18 comprises a lower tubular body 27, with a lower, narrower section 27a discharging into tank 19, and an upper, wider section 27b within which lower section 27a part-ally extends with a segment 27c. The segment defines, in co-operation with the bore of upper section 27b, an annular hollow space 28. Manifold 18 further comprises an open bottomed cup 29, into which the powder is discharged from passage 17, perimetrically supported by the free edge of upper section 27a of body 27. The open bottom of cup 29 is in part fitted within segment 27c. internally funnel shaped, so as to define an annular meatus 30 which communicates hollow space 28 with the inside of lower section 27a of body 27.

A tapping duct 31 extends between the inside of inflow pipe 20, i.e. the slightly higher one, and hollow space 28, via a hole 32 formed in the bottom of the latter.

Tank 19 is also connected with an outflow pipe 33, opening in wall 19a too, near the bottom of the tank itself. The water collected inside tank 19 is delivered through pipe 33, by means of a pump 34, to the water works to be fed. Finally, a pipe 36 sideways discharges into tank 19, for bringing in a pH-controlling agent, delivered by a vibration pump 35, schematically shown in FIG. 7.

A microprocessor controlled electronic assembly, not shown, with the relevant operation keys, is placed in housing 9, for operating, according to programmable time sequences, motor reducer 38, shaft 14, pump 34 and pH-controlling vibration pump 35 through a cable system, not shown either. The cable system is intercepted by a panel 39 of connecting terminals, placed on a side wall of lower container 2. Panel 39 permits the connection of external instruments, provided with means for reading the parameters to be controlled in the water works and suitable to permit, on the basis of the signals transmitted by said means, an automatic feedback control of the dosing apparatus.

The dosing apparatus according to the present invention works in the following way. The disinfectant powder is loaded into feedbox 3 through opening 7 of cover 4 and comes in this way to dosing assembly 10, filling cavity 13 of delivery element 11. The rotation of shaft 14, thanks to its screwed profile, forces the powder towards chamber 16, from which it is dropped into cup 29 of manifold 18 through passage 17.

Rotation and stop times of shaft 14, the rotation speed of which is kept constant, establish the amounts of dosed powder and are automatically controlled, according to pre-programmed instructions on the microprocessor electronic assembly, to keep the desired additive percentage in the water of the works (e.g. in case of swimming pools about 0.6÷1 ppm)

Air feeding into chamber 16 via duct 41 prevents any possible cementation of the additive, effect of the moisture it naturally tends to absorb, thus avoiding an unsmooth running or even a stop of shaft 14. Said air feeding can be provided by means of the connection of duct 41 to the air cooling system of pump 34 or, alternatively, to a small auxiliary fan.

Contemporaneously inflow water, preventively filtered according to any conventional method, e.g. with activated carbon, enters tank 19 through inflow pipes 20 and 21. From pipe 20 a part of the water is tapped via duct 31 and brought into annular hollow space 28 of manifold 18. From it water overflows throughout meatus 30, creating a turbulence which assists its mixing with the additive dropped through passage 17. Then, the additive-mixed water goes down, through lower section 27a of body 27, into tank 19, where it meets the already present water, to be taken away and fed to the water works via outflow pipe 33, thanks to pump 34.

Float 22, controlling the flow through inflow pipe 20, stops the same when the water level in the tank overcomes a predetermined value. When said level decreases, to prevent pump 34 from idling, with all the involved inconveniences, float 23 opens also inflow pipe 21, placed in a lower position to establish a different intervention level. A higher amount of water is then brought into the tank and the level quickly returns to a value which permits a regular running of the pump.

Similarly, to keep the pH in the works at a desired value, the timed inlet of the relevant agent to tank 19, via pipe 36 and by means of vibration pump 35, is controlled. More specifically, the pH controlling agent shall be delivered so as to avoid its mixing with the disinfectant additive, whereby a possible chemical incompatibility between the two agents does not involve functional and workers' safety problems. The mentioned expedient is in any case sufficient to achieve the purpose, and, due to the particular dilution method, no complex check and security systems are needed.

The worker can check regularly, by means of suitable reading means, the additive percentage and the pH in the water of the works and, as a function of the read values, can turn off the pre-determined control program and directly operate the delivery, for example increasing that of the additive if a long stop has caused its percentage to fall down. In the same way, as above mentioned, the connection of suitable instruments to panel 39 allows the turning off of the time sequence control program and the automation of a feedback dosing.

It will be apparent in light of the above that the frequency of cleaning and maintenance interventions, both on dosing assembly 10 and on the outflow system, is very low. In fact the flow fed to the works through pipe 33 is substantially constant, apart from the amount of additive-mixed water delivered by manifold 18. Besides, the high turbulence generated within manifold 18, thanks to its special structure, prevents deposits of solid material from forming on the walls thereof, which would reduce the water flow section. The possible formation of deposits is in any case strongly inhibited thanks to the inflow to tank 19, via pipe 36, of the pH controlling agent.

Whenever necessary, to lower the pH value further in the outflow piping and in the whole water works, carbon dioxide can be added downstream pump 34, by means of automatically or semiautomatically controlled feeders. It is to be noted in this connection that, as an example, the regulations related to the field of swimming pools prescribe that the pH of the water shall be comprised between 7.2 and 7.6.

To assist the rotation of shaft 14, bushings 15a, 15b, as well as delivery element 11 are preferably made of polypropylene, whereas shaft 14 itself is made of delrin™.

The dosing apparatus according to the invention is, as above said, particularly suitable for use in the field of swimming pools. In this case the disinfectant substance is typically a mixture containing 65 in weight of calcium hypochlorite and 35% of inert material. Since this additive, as well as other chlorine based ones, is chemically very active, the components which come directly into contact with it, such as feedbox 3, are made of a plastic material having a high resistance to corrosion (e.g. polystyrene).

The advantages brought by the use of the dosing apparatus according to the invention will be apparent from the above. By the way, apart from the already cited savings in operation and maintenance costs, allows product savings up to 60% with respect to the conventional systems. This because, since the product is not subject to any preliminary dilution, it can be actually preserved and a much lower amount thereof is needed to accomplish the same results in term of disinfectant action quality.

Namely in the case of use in swimming pools, thanks to the direct, quick and effective mixing of the product with water, the dosing apparatus permits to accomplish an homogeneous product spreading throughout the whole volume of the pool in a very short time. Besides, the workers never come into contact with water containing a high additive percentage, like that in the preliminary tank of the known system, whereby they can work in more comfortable and safer conditions.

Other variations and/or modifications that can be brought to the apparatus for dosing powdered or granulated additives in water works, namely swimming pools according to the invention fall within the scope of the invention itself as stated in the appended claims.

What is claimed is:

1. An apparatus for dosing a powdered or granulated additive in a water works, comprising a dosing assembly (10) hydraulically connected to said works, and means (3) for containing said additive, capable of conveying said additive towards said dosing assembly (10), said dosing assembly comprising:

water collecting means (19) hydraulically connected to at least one inflow (20, 21) of unmixed water and to at least one outflow (33) of additive-mixed water;

means (24, 25) for controlling said water inflow;

pump means (34) for supplying water through said outflow; and means (11) for delivering said additive from said containing means (3) towards said water collecting means (19), said dosing assembly also comprising a manifold (18) arranged over said water collecting means (19) and over a means (31) for tapping said unmixed water from said inflow to said manifold (18), the manifold comprising a lower, narrower tubular section (27a), communicating with said water collecting means (19) and an upper, wider tubular section (27b), within which said lower section (27a) partially coaxially extends, so that between the two sections an annular hollow space (28) is defined, said tapping means (31) being hydraulically connected with said hollow space (28), said manifold (18) further comprising an upper, open bottom cup-shaped body (29), into which said additive is discharged from above, said body being fitted within said lower section (27a) so as to defined in cooperation therewith an annular meatus (30), whereby said additive mixes with water flowing through said meatus (30), and additive mixed water is discharged into said collecting means (19).

2. The apparatus according to claim 1, wherein said lower section (27a) of said manifold (18) comprises an upper side (27c) having a funnel-shaped inner surface.

3. The apparatus according to claim 1, wherein said additive delivering means (11) comprise a delivery element (11), in a seat (12) of which screwed means (14) are rotatably supported, said seat (12) being communicated with said additive collecting means (3) and with said manifold (18) via respective passages (13, 17) formed in said element, whereby the rotation of said screwed means (14) within said seat (12) causes the additive to convey into said manifold (18).

4. The apparatus according to claim 3, wherein said seat (12) is substantially cylindrical and said screwed means (14) comprise a shaft (14) rotatable therein, said shaft being formed in said delivery element (11) with an axis of rotation substantially orthogonal to said passages (13, 17) and an axis of said manifold (18), said manifold (18) radially extending from said seat (12).

5. The apparatus according to claim 4, wherein a conical shaped chamber (16) for collecting said additive is formed in said delivery element, coaxially to said seat (12) and downstream thereof.

6. The apparatus according to claim 4, wherein air feeding means (41) are associated to said delivery element (11), to keep said additive dry within said delivery element (11).

7. The apparatus according to claim 6, wherein said air feeding means comprise a duct (41) coaxially engaging within a hole (40) formed in said delivery element (11).

8. The apparatus according to claim 1, wherein said water collecting means comprise a constant level tank (19), hydraulically communicated with two inflows (20, 21) of unmixed water and with said outflow (33) of additive-mixed water to said works, said means (24, 25) for controlling said water inflow being operated by respective float means (22, 23), said inflows (20, 21) being placed at different heights with respect to the bottom of said tank (19), said tapping means (31) being connected to the higher inflow (20).

9. The apparatus according to claim 8, wherein said manifold is engaged within a circular opening (26) formed in a cover wall of said tank (19).

10. The apparatus according to claim 1, wherein means (35) for dosing a pH reducing agent are hydraulically connected to said water collecting means (19).

* * * * *